Dec. 11, 1951   L. J. CHARIPAR   2,578,126
TOOL
Filed Feb. 13, 1947
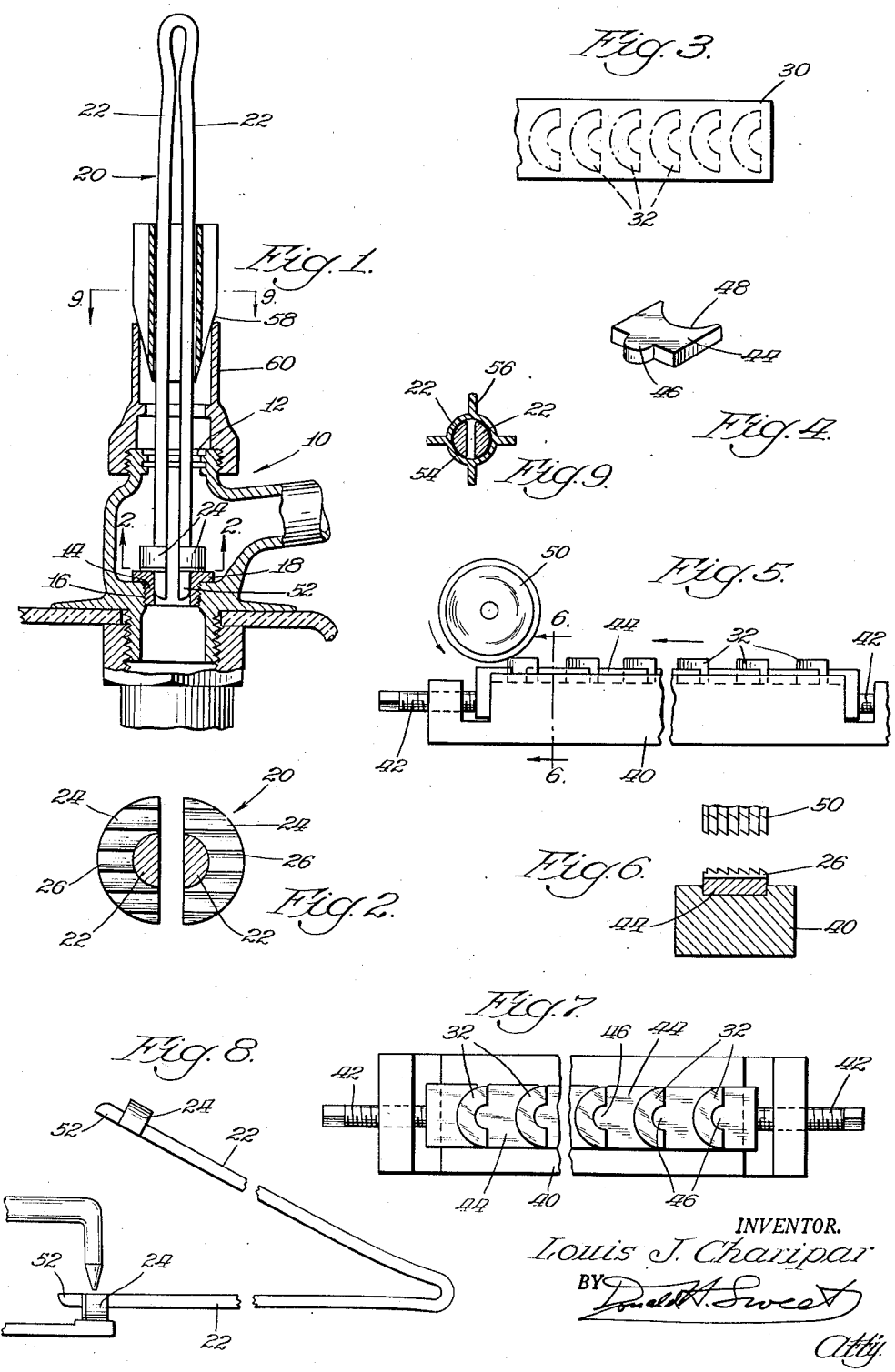
INVENTOR.
Louis J. Charipar
BY
Atty.

Patented Dec. 11, 1951

2,578,126

UNITED STATES PATENT OFFICE 2,578,126

TOOL

Louis J. Charipar, Chicago, Ill.

Application February 13, 1947, Serial No. 728,335

4 Claims. (Cl. 90—12.5)

My invention relates to maintenance tools and includes among its objects and advantages a tool especially adapted for such uses as cleaning and smoothing the valve seat of faucets such as those used in the household.

With long use, the valve seats of household faucets, due to dirt and corrosion, lose the smoothness and flatness of seating surface which is necessary for proper operation of the valve. It is, therefore, necessary from time to time to remove the handle of the faucet, thus gaining access to the valve seat, so that it may be cleaned. In the past it has been necessary to use a tool of a particular size for each size of valve seat to be cleaned; and plumbers and other persons frequently performing such a cleaning operation usually have a considerable variety of tools to accommodate the various sizes of faucet valve seats which are ordinarily encountered.

In the accompanying drawing:

Figure 1 is a vertical cross-sectional view of a conventional faucet, together with a side elevation of a novel cleaning tool embodying the invention;

Figure 2 is a cross-sectional view of the cleaning tool taken along the line 2—2 of Figure 1;

Figure 3 is a diagrammatic representation of a strip of metal illustrating the manner of fabrication of the cutter;

Figure 4 is a perspective view of a spacer which is employed in the fabrication of the cutting tool;

Figure 5 is a side elevation of a jig retaining parallel blanks, together with a shaping tool, illustrating the method of manufacture of the cutter;

Figure 6 is a vertical cross-sectional view taken along the line 6—6 of Figure 5 with the shaping tool therein illustrated somewhat displaced for purposes of clarity of illustration;

Figure 7 is a plan view of the jig of Figure 5;

Figure 8 is a side elevation of the complete tool in a welding fixture; illustrating a step in the manufacture of the tool; and Figure 9 is a section on line 9—9 of Figure 1.

Referring first to Figure 1 the conventional faucet is generally designated by the numeral 10. The faucet 10, has an annular valve seat 14, aligned with the handle aperture 12, from which the handle and packing (not shown) have been removed. The valve seat 14, has an externally threaded body 16 and a flanged upper portion 18, the upper surface of which constitutes the seat for the packing which makes the valve closure.

The cleaning tool, generally designated by the numeral 20, comprises a bifurcated, elongated member, each of the 2 portions 22 of which is semi-circular in cross section as illustrated in Figure 2. This member may advantageously be a conventional soft steel 4½" cotter pin, case hardened to provide springiness so that the portions 22 expand against the inner wall of the valve seat 14. Spaced a short distance from the lower end of the tool 20 are two oppositely disposed half-annular cutter flanges 24 having saw teeth cut into the lower faces 26, thereof. As illustrated in Figure 2, the saw teeth are not the conventional radial saw teeth common to such cutting or abrading tools, but are parallel. The fabrication of such parallel saw teeth is extremely simple compared to that of cutting radial teeth into such a tool. The cost of production is, therefore, greatly reduced by the employment of such parallel saw teeth. At the same time the fact that some of the teeth move substantially at right angles to their cutting edges, while others are inclined in opposite directions at various angles increases the efficiency of the cutting surface 26 in cleaning grime and corrosion from the upper face of the valve seat 14.

The fabrication of the cutting flanges 24 of the novel cutting tool 20 is commenced by stamping half-annular blanks 32 from a strip 30 of soft steel, as illustrated in Figure 3. The blanks 32 are then inserted into a jig 40 having clamping screws 42 at the ends thereof, the blanks 32 being spaced apart and held in alignment by spacers 44 having a front edge with a tab or protrusion 46 substantially semi-circular in shape and conforming to the dimensions of the inner diameter of the half-annular blanks 32, and a back edge having a substantial semi-circular recess 48 of dimensions conforming to the outer diameter of the blanks 32, so that a long series of blanks 32 may be assembled with spacers 44 and held in alignment, the whole assembly being clamped as a unit by the clamping screws 42 into the jig 40. Jig 40 is then run under a rotating cutting tool 50 to make a series of parallel saw teeth defining the cutting surface 26. The cutter flanges 24 thus formed, which have inner diameters corresponding to the outer diameters of the semi-circular portions 22, are then spot welded to the portions 22 as illustrated in Figure 8.

The machining of the cutter flanges and the assembly according to Figure 8 is performed while all the parts are in annealed condition and the arms 22 can readily be separated by bending so that their ends are accessible to the spot welder.

Thereafter the arms are bent back toward each other to a predetermined position and the entire assembly is case hardened. As the valve seats are uniformly of brass or similar non-ferrous metal, this hardens the cutting teeth sufficiently to enable them to function effectively, and the hardened surface thus formed on the cotter pin gives it ample resilience.

The projecting portions 52 present cylindrical surfaces to the inner walls of the body 16 and are pressed firmly against those walls during rotation of the tool to clean and machine the valve seat by the resilience of the arms 22. In case the valve seat has a polygonal center bore, the resulting slight radial displacements of the cutters will only assist and improve the action of the cutting teeth in forming a clean, smooth surface.

Anyone with fair mechanical ability can use the tool as above described and secure satisfactory results. To assist persons with little ability I provide a simple guide of plastic, including a barrel 54 shaped to fit over the arms 22, with four radial ribs 56, having beveled lower ends at 58. Such a guide can function by contact with the aperture 12, or the usual bonnet may be put back on the faucet after the valve proper has been removed, to get a smoother guide contact at a greater distance above the valve seat.

Others may readily adapt the invention for use under various conditions of service by employing one or more of the novel features disclosed or equivalents thereof. It will be obvious that the cutters could be shaped with the teeth shorter next the arms 22, so that the seat will always retain a raised lip adjacent the bore. As at present advised with respect to the apparent scope of my invention, I desire to claim the following subject matter.

1. A valve reseating tool comprising, in combination: a one-piece U-shaped handle; each leg of said handle being of uniform cross section; the cross section of each leg being a half circle; the flat faces of said legs facing toward each other; and a one-piece half-flange attached on the curved face of each leg at a point spaced inwardly from the end of the leg; each flange having a serrated face defining cutting edges on the half-annular face facing toward the end of the leg; said edges being all parallel to each other, whereby rotation of the tool about its axis causes successive edges to scrape at different angles; the edges on said half-flanges facing in the same sense with respect to rotation around the axis of said tool; said handle being resilient and tending to separate its legs more widely than the position resulting from inserting the leg ends in a valve seat, whereby correct guiding contact with the valve seat is maintained without adjustment or attention by the operator.

2. A valve reseating tool comprising, in combination: a one-piece U-shaped handle; each leg of said handle being of uniform cross section; the cross section of each leg being a half circle; the flat face of said legs facing toward each other; and a one-piece half flange attached on the curved face of each leg at a point spaced inwardly from the end of the leg; each flange having a serrated face defining cutting edges on the half-annular face facing toward the end of the leg; said edges being all parallel to each other, whereby rotation of the tool about its axis causes successive edges to scrape at different angles.

3. A valve reseating tool comprising, in combination: a one-piece U-shaped handle; each leg of said handle being of uniform cross section; the cross section of each leg being a half circle; the flat face of said legs facing toward each other; and a one-piece half flange attached on the curved face of each leg at a point spaced inwardly from the end of the leg; each flange having a serrated face defining cutting edges on the half annular face facing toward the end of the leg; said handle being resilient and tending to separate its legs more widely than the position resulting from inserting the leg ends in a valve seat, whereby correct guiding contact with the valve seat is maintained without adjustment or attention by the operator.

4. A valve reseating tool comprising, in combination: a one-piece U-shaped handle; each leg of said handle being of uniform cross section; the cross section of each leg being a half circle; the flat face of said legs facing toward each other; and a one-piece half flange attached on the curved face of each leg at a point spaced inwardly from the end of the leg; each flange having a serrated face defining cutting edges on the half annular face facing toward the end of the leg; said handle being resilient and tending to separate its legs more widely than the position resulting from inserting the leg ends in a valve seat, whereby correct guiding contact with the valve seat is maintained without adjustment or attention by the operator.

LOUIS J. CHARIPAR.

REFERENCES CITED

The following references are of record in the file of this patent:

UNITED STATES PATENTS

| Number | Name | Date |
| --- | --- | --- |
| 1,062,464 | Haynes | May 20, 1913 |
| 1,641,754 | Glover et al. | Sept. 6, 1927 |
| 1,862,810 | Stone | June 14, 1932 |
| 1,911,847 | Reilly | May 30, 1933 |
| 1,996,118 | Norton | Apr. 2, 1935 |
| 2,009,496 | Johnson | July 30, 1935 |
| 2,275,393 | Myers et al. | Mar. 3, 1942 |